March 31, 1953 J. G. LINDEMAN 2,633,068
HITCH DEVICE
Filed June 24, 1947 3 Sheets-Sheet 1
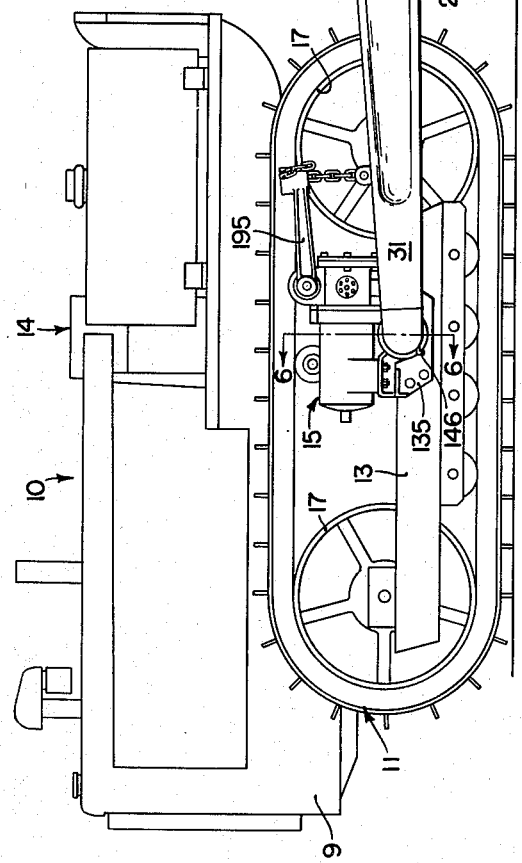
INVENTOR.
JESSE G. LINDEMAN
ATTORNEYS March 31, 1953    J. G. LINDEMAN    2,633,068
HITCH DEVICE
Filed June 24, 1947    3 Sheets-Sheet 2
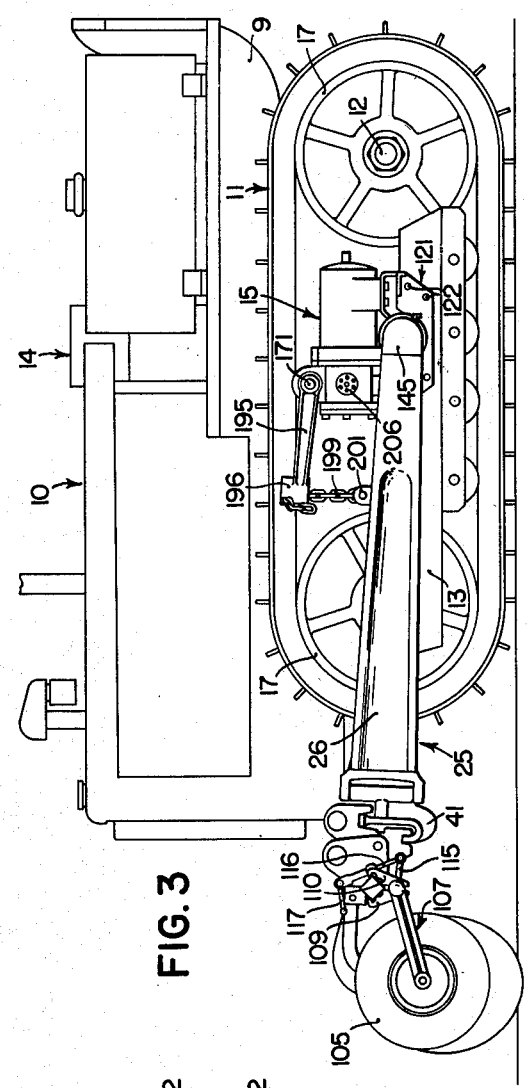
INVENTOR.
JESSE G. LINDEMAN
ATTORNEYS March 31, 1953 J. G. LINDEMAN 2,633,068
HITCH DEVICE
Filed June 24, 1947 3 Sheets-Sheet 3
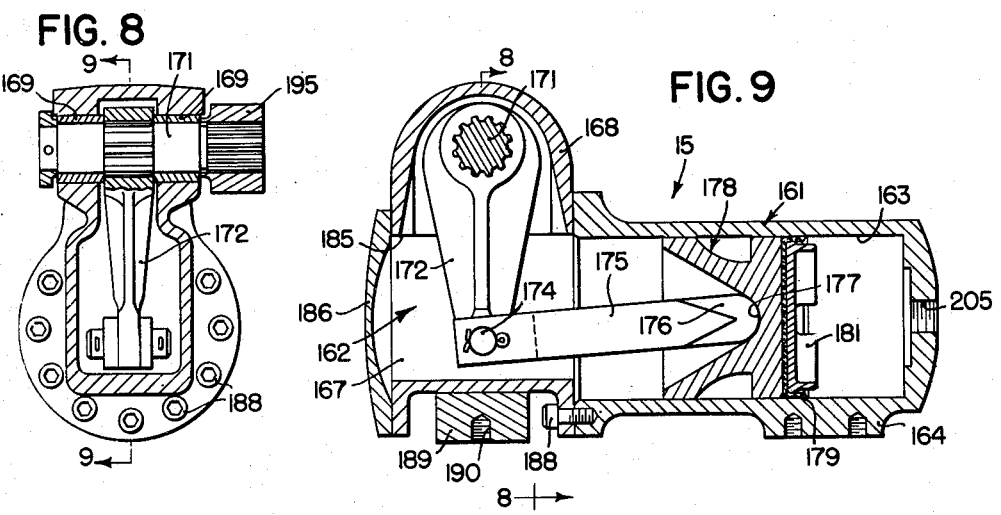
INVENTOR.
JESSE G. LINDEMAN
BY
ATTORNEYS Patented Mar. 31, 1953

2,633,068

UNITED STATES PATENT OFFICE 2,633,068

HITCH DEVICE

Jesse G. Lindeman, Yakima, Wash., assignor, by mesne assignments, to Deere & Company, Moline, Ill., a corporation of Illinois Application June 24, 1947, Serial No. 756,693

7 Claims. (Cl. 97—50)

The present invention relates generally to agricultural implements and similar implements and more particularly to earth working machinery.

The object and general nature of the present invention is the provision of a new and improved tool carrier adapted to receive and/or support earth working means, such as cultivating tools, material moving or handling means, and the like, and particularly it is a feature of this invention to provide a tool carrier which is adapted to be mounted on a tractor so as to dispose the tool or tools in either a front position, or a rear position, relative to the tractor, as desired.

More specifically, it is an object of this invention to provide a tool carrier which may be reversed relative to the tractor with a minimum amount of manual effort, and it is a further feature of this invention to provide a tool carrier of the hydraulically operated and/or controlled type wherein the hydraulic means is conveniently and easily reversed, relative to the tractor, with the tool carrier.

These and other objects and advantages of the present invention will be apparent to those skilled in the art after a consideration of the following detailed description, taken in conjunction with the accompanying drawings.

In the drawings:

Figure 1 is a side view of the preferred form of the present invention, shown as connected to a propelling agency in the form of a tractor of the crawler tread type.

Figure 2 is a plan view of the outfit shown in Figure 1.

Figure 3 is a view similar to Figure 1, with the tool unit shown as mounted in a front position.

Figures 4—6 are fragmentary detail views of the hydraulic cylinder support on each of the track frames.

Figure 7 is a side view of one of the hydraulic piston and cylinder units.

Figure 8 is an enlarged sectional view taken generally along the line 8—8 of Figure 9.

Figure 9 is a view taken generally along the line 9—9 of Figure 8.

For the purpose of illustration I have shown my invention in use with a tractor 10 of the track or crawler tread type having treads or tracks 11 operatively connected, as by means 12, with the main body 9 of the tractor 10. The latter is of a commercial type extensively used and has at each side the above mentioned treads or tracks 11 suitably mounted on track frames 13 connected, as aforesaid, by means 12 to the main frame of the tractor. The tractor 10 includes a suitable power plant and also a hydraulic unit 14 of conventional construction driven from said power plant and including suitable control means (not shown) whereby fluid under pressure may be delivered to or withdrawn from one or more hydraulic piston and cylinder units 15 to which more detailed reference will be made below. Each track frame 13 includes front and rear sprocket wheels 17 over which the crawler tracks or treads 11 pass.

The tool carrier, which constitutes the principal portion of the present invention, is indicated in its entirety by the reference numeral 25 and comprises right and left hand side arms 26 and 27 and a cross bar 28, normally rigidly connected to the outer ends of the side arms 26 and 27. The latter members preferably are identical, except that parts thereof may be right hand or left hand as the case may be, and hence a description of one of them will suffice. Each side arm comprises a tubular member 31 made up of a pair of channel-like elongated members 32 and 33 arranged in opposing relation and having their flanges suitably secured together, as by welding, at 34.

At their forward ends the channel members 32 and 33 are secured, as by welding, to a bifurcated terminal member 37 having upper and lower apertured lugs 38 and 39. A bracket member 41 is connected to each terminal member 37 by any suitable means, such as a pin 42. Each bracket member 41 includes a lower hook-like portion and an upper abutment section. Each member 41 preferably is in the form of a steel casting which is formed with a vertical spindle portion apertured to receive the pin 42. Each member 41 also includes a horizontal sleeve section in which a fitting-engaging latch plunger is slidably disposed. The latch is operated by a latch lever 51 pivoted to the outer end of the plunger. The innermost end of each latch lever 51 is pivotally connected with the bracket 41 whereby an outward movement of the outer portion of the lever 51 serves to withdraw the latch plunger. Each fitting-receiving bracket 41 is secured, as by welding or the like, to a laterally inwardly directed sleeve or pipe 55, and the laterally inner ends of the two tubular members 55 are telescopically associated with an adjusting sleeve 56 which is provided with a plurality of pairs of openings. The sleeve member 56 is secured, as by welding, to one of the sleeves 55 while the other sleeve carries a pair of reenforcing apertured boss sections 59 through which a detachable pin 61 is disposed. The pin 61 is adapted to be passed through selected pairs of openings in the section 56 for rigidly connecting the two sleeve portions 55 together. The latter portions, together with the sleeve section 56, constitute the rigid cross bar member 28 referred to above.

One of the several implements which is adapted to be mounted on the tool carrier 25, described above, is shown in Figures 1–3 by the reference numeral 65. The implement 65 comprises a tool bar 66, preferably square in cross section, a pair of tool units 67 connected by clamps 68 and 69 to the tool bar 66, each tool unit being shown as including an earth working disk 71, and suitable adjustable mounting or fitting units 72 connecting the implement 65 to the tool bar carrier 25. Each fitting unit 72 comprises a pair of hingedly interconnected fitting members one of which is formed with a downwardly facing socket adapted to engage over a hook-like portion of the bracket 41. The fitting member is apertured to receive a trunnion member 83 which is provided with a screw threaded opening through which extends an adjusting screw 84. The fitting member also is provided with depending hook-like portions 87 and downwardly facing socket sections which are adapted to engage over the upwardly facing abutment portion on the bracket 41.

The other fitting member of each fitting unit 72 comprises a pair of plates welded or otherwise permanently fixed to the tool bar 66 in spaced apart relation and apertured in the upper portions thereof to receive a trunnion member 102 through which the outer end of the adjusting screw 84 extends. The latter member is oppositely screw threaded whereby turning the adjusting screw 84 in one direction or the other serves to pivot one of the fitting members on the other, thus raising or lowering the tool bar 66 relative to the associated side arm or arms. If one of the adjusting screws 84 is turned in one direction and the other turned in the other direction, the tool bar 66 is disposed in a tilted position relative to the side arms 26 and 27 and the associated rigid cross bar 28, such tilting being permissible within limits sufficient to provide for leveling of the tool bar 66. Also mounted on the tool bar 66, as shown in Figure 2, is a pair of gauge wheel units, each indicated in its entirety by the reference numeral 105. Each of the gauge wheel units includes a gauge wheel 106, a gauge wheel fork 107 receiving the gauge wheel 106 associated therewith and a clamping member 108, comprising a pair of parts 109 and 110 connected together by clamping screws 111. The members 109 and 110, with the clamping screws 111, are tightened, or firmly fixed to the outer end portions of the tool bar 66, as best shown in Figure 2. As best shown in Figure 3, each gauge wheel fork or yoke 107 includes an inwardly extending arm 115 which is connected by an adjusting screw 116 with one of the clamping members, such as the member 110, and the adjusting screw 116 is adapted to be turned by a crank 117 for raising or lowering the associated gauge wheel 105, as desired.

A draw trunnion 121 is disposed at each side of the tractor and preferably is rigidly secured, as by bolts 122, to the associated track frame 13, preferably adjacent the central portion of the latter. Each trunnion member 121 comprises an attaching bracket section 124 in which the holes receiving the bolts 122 are disposed and a double trunnion section 125 having inner and outer bearing portions 126 and 127, the latter being of smaller diameter than the inner section 126, and both being generally cylindrical. The bearing section 127 is provided with a transverse groove or slot 128 therein which cooperates with means on the associated side arm of the tool frame for holding the side arm in position, as will be referred to later in detail.

The laterally inner bearing section 126 of the trunnion 121 is disposed between abutment pads 131 and 132 that are formed integral with the trunnion member 121. The power unit 15 mentioned above, is mounted on a power cylinder mounting member 135 that is adapted to be carried on the laterally inner bearing section 126. The mounting member 135 includes a sleeve section 136 (Figure 7) and laterally outwardly extending sections 137 and 138 having a plurality of bolt holes to receive bolts 140 and 141 by which a cylinder unit, described below in detail, may be secured to the cylinder mounting member 135. The end portions 137 and 138 of the cylinder mounting member 135 form downwardly facing abutments that are adapted, when the sleeve section 136 is mounted on the bearing section 126 of the trunnion 121, to rest against the pads 131 and 132 on the member 121. Since each of the trunnion members 121 are firmly and rigidly secured to the track frames by the bolts 122, each cylinder unit mounted on the associated mounting member 135 is likewise supported by the associated bearing section 126 but is held against rocking movement thereon by the pads 131 and 132 and associated parts. The inner end of each of the side arms 26 and 27 of the tool frame 25 carries a socket member 145, and each socket member is adapted to fit over the outer bearing section 127 of the associated draw trunnion 121. A pin 146 is adapted to be inserted in openings in the socket member and to lie within the slot or recess 128, as shown in Figure 6, for the purpose of releasably holding the associated socket member against laterally outward displacement relative to the trunnion member.

Referring now to Figure 9, each of the power cylinder units 15 comprises a cylinder section 161 and a crank case section 162. The cylinder section 161 is formed internally as a cylinder 163 and adjacent one end has an attaching pad 164 provided with tapped openings to receive the cap screws 141 that extend upwardly through the holes in the cylinder mounting member 135. The crank case section 162 comprises a housing 167 having an upward extension 168 provided with bearing sections 169 (Figure 8) in which a shaft 171 is disposed for rocking movement. An arm 172 is fixed to the shaft 171 and extends downwardly into the housing 167, carrying a pivot member 174 to which the outer end of a connecting rod or pitman 175 is connected. The inner end of the connecting rod 175 is rounded, as at 176, and seats in a socket 177 formed in a piston member 178 disposed within the cylinder 163. The piston 178 carries suitable sealing means, such as a leather cup 179, and is held in place by a retainer 181. Access to the housing 167 is provided by an opening 185 which is closed in leak-tight relation by a cap 186. Similarly, the housing 167 is bolted, as at 188, to the outer end of the cylinder 161 in leak-tight relation. The housing 167 is also provided with a pad or bracket extension 189 having tapped openings 190 to receive fastening bolts 140 extending upwardly through openings in the cylinder mounting member 135.

The shaft 171 extends outwardly of the housing 167 in sealed relation and carries a power lift arm 195 having a chain socket 196 at its outer end. A slot 197 in the socket section 196 provides for the reception of a chain link therein whereby a chain 199, connected in any suitable way, as at 201, to the associated side arm, may be connected in adjusted relation between the side arm and the associated power lift arm 195. Fluid under pressure is delivered to one end of the cylinder 163, as at 205, under the control of suitable valve mechanism, not shown, whereby when fluid is delivered to the cylinder 163 and the piston 178 forced outwardly, the arm 195 is raised, thereby acting through the associated chain 199 to raise the tool frame, it being understood that fluid is delivered to both of the hydraulic power lift units 15 whereby the tool frame in being raised is loaded generally uniformly. A filtering vent device 206 is provided for the housing 167.

The operation of the tool carrier described above is substantially as follows.

Figure 1 shows the parts of the device arranged in trailing relation, with the tools 67 adapted to work the ground behind the tractor 10. If, for example, it should be desired to use tools that are adapted to be placed in front of the tractor, such as a scraper, snow plow or the like, it is a very easy matter to effect the necessary reversal of the tool frame 25. All that it is necessary to do is to disconnect the hose line from the hydraulic units 15, take out the latching pins 146, loosen the chains 199 and remove them from the chain sockets 196, swing the arms 26 and 27 away from the track frames, remove the two hydraulic units 15 and interchange them so that, instead of having the arms 195 extend rearwardly, the units 15 may be mounted so that the arms 195 extend forwardly, as shown in Figure 3, and then reconnect the several parts. In disconnecting the power units 15 it is, of course, not necessary to disconnect them from their mounting members 135.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a tool carrier for tractors and the like, a frame including a tool-receiving cross bar and a pair of side arms connected thereto, a pair of trunnions adapted to be fixed to said tractor, each of said trunnions including a pair of spaced abutments, a power unit adapted to be detachably mounted on each of said trunnions and each power means including spaced sections adapted to contact said abutments, whereby said power means is held against movement relative to said trunnions by virtue of contact with said abutments, a pair of socket members fixed to the outer ends of said side arms, and means on said socket members and said trunnions for holding said socket members on said trunnions.

2. In a tool carrier for tractors and the like, a frame including a tool-receiving cross bar and a pair of side arms connected thereto, a pair of trunnions adapted to be fixed to said tractor, each of said trunnions including a laterally outwardly extending trunnion stud and a pair of abutment sections disposed on opposite sides of said trunnion stud, an individually operable power unit for each of said trunnions, a pair of power-unit-receiving means, one for each of said trunnions and each including a stud-engaging sleeve and a pair of oppositely extending sections adapted to contact, respectively, the abutments of the associated trunnion, means carried by said oppositely arranged sections for connecting the associated power unit thereto, each power unit including an operating arm, means connecting the arm of each of said power units to the associated side arm, a pair of socket members fixed to the outer ends of said side arms, and means including a releasable pin for each socket member engageable with the associated trunnion for holding said socket members on said trunnions.

3. In a tool carrier for tractors and the like, a frame including a tool-receiving cross bar and a pair of side arms connected thereto, a pair of trunnions adapted to be fixed to said tractor, a pair of socket members fixed to the outer ends of said side arms, means for holding said socket members on said trunnions, and power means acting against said trunnions for raising said frame, said power means including a pair of separately operable hydraulic units, an attaching member for each of said units, each of said attaching members including a trunnion-receiving section and laterally outwardly extending cylinder-receiving sections, and connecting means for fastening each hydraulic unit to the associated sections, said hydraulic units being interchangeable from one side of the tractor to the other and said side arms being reversible from front to rear relative to the tractor.

4. In a tool carrier for tractors and the like, a frame including a tool-receiving cross bar and a pair of side arms connected thereto, a pair of double trunnions adapted to be fixed to opposite sides of the tractor, each of said double trunnions including a pair of axially spaced bearing sections, a pair of power unit mountings, one for each side of the tractor, each mounting comprising a member receiving the inner of said bearing sections of the associated trunnion, means acting between said mounting and said trunnion for maintaining said mounting against rotation, a pair of power units mounted on said mountings, contacting means on said mountings and said power units for holding the latter against rotation relative to said trunnions, and means acting between each of said power units and the associated side arm for raising and lowering said frame relative to the tractor.

5. The invention set forth in claim 4, further characterized by said last-mentioned means including an arm pivoted on each power unit and swingable relative to the associated power unit mounting, and means connecting the outer end of each pivoted arm to the associated side arm.

6. In a tool carrier for tractors and the like, a pair of trunnion members adapted to be fixed to opposite sides of the tractor generally centrally thereof, each having oppositely extending mounting-receiving portions, a tool frame having side arms, socket members carried by said side arms to receive portions of said trunnion members, a pair of separately operable power operated units detachably mounted on said trunnion members, a mounting member carried by each trunnion and having oppositely extending portions in contacting engagement with said oppositely extending portions on the trunnion, means on each power unit adapted to engage with said oppositely extending portions of the associated mounting member to hold the power unit against rotation on said trunnion members, and means connecting said power units with said side arms, said power units and side arms being detachable from said trunnion members to accommodate the disposition of said frame either at the front or rear of said tractor, said power units being reversible, relative to the tractor, with said side arms.

7. The invention set forth in claim 6, further characterized by each of said power units including a lift arm and means connecting the lift arm with the associated side frame, said lift arms and associated parts being reversible, relative to the tractor, with said side arms whereby operation of said power units, in either position of said power units and frame, serves to raise the latter.

JESSE G. LINDEMAN.

REFERENCES CITED

The following references are of record in the file of this patent:

UNITED STATES PATENTS

| Number | Name | Date |
|---|---|---|
| 1,575,011 | Seaholm | Mar. 2, 1926 |
| 2,081,939 | LeTourneau | June 1, 1937 |
| 2,239,943 | Sword | Apr. 29, 1941 |
| 2,314,475 | Bird et al. | Mar. 23, 1943 |
| 2,322,115 | Cox et al. | June 15, 1943 |
| 2,341,151 | Maloon | Feb. 8, 1944 |
| 2,426,529 | Silver | Aug. 26, 1947 |
| 2,444,321 | Wooldridge | June 29, 1948 |

FOREIGN PATENTS

| Number | Country | Date |
|---|---|---|
| 285,748 | Germany | July 12, 1915 |